United States Patent
O'Gorman et al.

(10) Patent No.: US 12,397,243 B2
(45) Date of Patent: Aug. 26, 2025

(54) METHOD AND DEVICE FOR CONTROLLING THE PRODUCTION OF AN EXTRACT USING A SOLID-LIQUID EXTRACTION PROCESS

(71) Applicant: GEA TDS GmbH, Sarstedt (DE)

(72) Inventors: Colm O'Gorman, Royston (GB); Ulrich Rolle, Everswinkel (DE); Maria Carmen Leal Garcia, Münster (DE); Ludger Tacke, Velen (DE); Franz-Josef Helms, Sarstedt (DE)

(73) Assignee: GEA TDS GmbH, Sarstedt (DE)

( * ) Notice: Subject to any disclaimer, the term of this patent is extended or adjusted under 35 U.S.C. 154(b) by 746 days.

(21) Appl. No.: 17/598,032

(22) PCT Filed: Feb. 19, 2020

(86) PCT No.: PCT/EP2020/000045
§ 371 (c)(1),
(2) Date: Sep. 24, 2021

(87) PCT Pub. No.: WO2020/192959
PCT Pub. Date: Oct. 1, 2020

(65) Prior Publication Data
US 2022/0184524 A1     Jun. 16, 2022

(30) Foreign Application Priority Data
Mar. 28, 2019  (DE) ..................... 10 2019 002 218.1

(51) Int. Cl.
*B01D 11/02*    (2006.01)
*A23F 3/18*     (2006.01)
(Continued)

(52) U.S. Cl.
CPC ............ *B01D 11/0207* (2013.01); *A23F 3/18* (2013.01); *A23F 3/22* (2013.01); *A23F 3/423* (2013.01);
(Continued)

(58) Field of Classification Search
CPC ... A23F 3/18; A23F 3/22; A23F 3/423; B01D 11/0207; B01D 11/0223; B01D 11/0257;
(Continued)

(56) References Cited

U.S. PATENT DOCUMENTS 3,338,820 A    8/1967  Wolk et al.
4,336,143 A    6/1982  Abbott
(Continued)

FOREIGN PATENT DOCUMENTS

CN    109126191 A    1/2019
CN    109569018 A    4/2019
(Continued)

*Primary Examiner* — John Kim
(74) *Attorney, Agent, or Firm* — Young Basile Hanlon & MacFarlane, P.C.

(57) ABSTRACT

Controlling the production of an extract using solid-liquid extraction that improves the exchange of material during the extraction process and allows a controlled dehumidification of a raffinate with residual moisture in order to obtain additional valuable extract is described. The steps include providing a first mass in an extraction container, supplying a second mass to the first mass without spatial constraints and distributing and mixing the second mass into and with the first mass, discharging a mixture of the extract and the raffinate from the extraction container, separating the discharged mixture into the raffinate with residual moisture and extracts released from the raffinate with residual moisture, and further treating the raffinate with residual moisture at least such that the residual moisture consisting of the extract is at least partly removed from the raffinate with residual
(Continued)

moisture by dehumidification and is supplied to the already separated extract.

24 Claims, 4 Drawing Sheets

(51) Int. Cl.
    *A23F 3/22*       (2006.01)
    *A23F 3/42*       (2006.01)
    *B01D 37/04*     (2006.01)

(52) U.S. Cl.
    CPC ...... *B01D 11/0223* (2013.01); *B01D 11/0257* (2013.01); *B01D 11/0284* (2013.01); *B01D 11/0288* (2013.01); *B01D 37/043* (2013.01)

(58) Field of Classification Search
    CPC ............ B01D 11/0284; B01D 11/0288; B01D 37/043
    See application file for complete search history.

(56) References Cited

U.S. PATENT DOCUMENTS

| | | |
|---|---|---|
| 6,203,837 B1 | 3/2001 | Kalenian |
| 2006/0202172 A1 | 9/2006 | Herrmann et al. |
| 2007/0098628 A1 | 5/2007 | Russell et al. |
| 2017/0208986 A1 | 7/2017 | Watanabe |

FOREIGN PATENT DOCUMENTS

| | | |
|---|---|---|
| DE | 699 29 220 T2 | 8/2006 |
| EP | 2 837 290 A1 | 2/2015 |
| WO | 99/023178 A1 | 5/1999 |

METHOD AND DEVICE FOR CONTROLLING THE PRODUCTION OF AN EXTRACT USING A SOLID-LIQUID EXTRACTION PROCESS

TECHNICAL FIELD

The invention relates to a method and a device for controlling the production of an extract by means of solid-liquid extraction, preferably a hot solid-liquid extraction process, and in particular for large-scale industrial applications, using at least one extraction container.

BRIEF SUMMARY

Methods of traditional tea production have been known for quite a while; they are however not or only slightly suitable for industrial or semi-industrial production of a tea concentrate or a tea beverage because they meet their limits due to the physical circumstances.

The essential features for the industrial extraction of a tea solution as mentioned above are known from US 2017/0 208 986 A1. The extraction occurs in a fixed bed of an extraction container, i.e., the primary mixture is subject to spatial constraints with respect to its degrees of freedom of movement and its swelling ability in the secondary solvent. After the extraction, only the extract is discharged from the extraction container, and the raffinate remains as a raffinate with residual moisture in the extraction container. The discharged flow of extract undergoes further treatment such that its solid content is controlled in-line. The raffinate with residual moisture remaining in the extraction container does not experience any further procedural treatment such as for dehumidification.

Essential features for industrially extracting a tea solution are also known from EP 2 837 290 A1. It is proposed therein that the tea raw materials are brought into contact for a predetermined dwell time in a standing liquid in a method step and with a flowing liquid in another method step. The sequence of the method steps is not specified. After expiration of the dwell time, the tea solution is discharged and, according to an advantageous embodiment of the method, a predetermined amount of a liquid is simultaneously supplied to the extracted tea raw material in batches or continuously in a flow while removing the tea solution. The above-described method is carried out in a container, wherein after draining the container, the liquid adhering to the remaining extracted tea raw material is dissolved by pressure surges of gas.

A method for extracting a consumable material consisting of a solid raw material, such as coffee or tea, is described in DE 699 29 220 T2 or PCT/US99/23178. The solid raw material is formed in an enclosed volume of a container, for example in the form of a bed. A volume of aqueous solvent is fed to the enclosed volume and the quantity of solid raw material. The extraction occurs under the exertion of pressure, wherein the solvent is water at a temperature that exceeds room temperature and is preferably between approximately 88 and approximately 100° C. The water flows through the solid raw material, and the aqueous extract generated thereby is discharged from the container.

CN 109 569 018 A discloses a circulating line for the solvent guided via an extraction container with the primary mixture that branches off of a drain line and joins the headspace of the extraction container. Independent of the circulating line, a feedline joins from above the headspace of the extraction container.

BRIEF SUMMARY

An object of the present invention is to create a method for controlling the production of an extract by means of solid-liquid extraction, in particular solid-liquid hot extraction, and a device for performing the method, preferably for large industrial applications that, on the one hand, improve the exchange of material during the extraction in comparison to prior art solutions and that, on the other hand, enable a controlled dehumidification of a raffinate with residual moisture to obtain additional valuable extract.

In general, and using at least one extraction container, a secondary solvent with a predetermined first mass and a primary mixture consisting of a solid, primary solvent and a transition component with a predetermined second mass are brought into contact with each other for a predetermined dwell time to obtain the extract. Following the dwell time, the obtained abstract and a complementary portion of raffinate are separated from each other. By means of the proposed invention, in particular the production of a tea concentrate is controlled that is procedurally and technologically based on the aforementioned solid-liquid extract, and in which the tea raw material such as tea leaves, flowers, stalks, grains, seeds, roots, or other plant components and hot water or boiling water are brought into contact with each other.

In the following, in addition to the terms for the general use of the method according to the invention, reference will be made to the special production of a tea concentrate by means of the method according to the invention, wherein the appropriate terms for special production will be in square brackets and italicized.

The invention is procedurally based on method for controlling the production of an extract [tea concentrate] by means of solid-liquid extraction using at least one extraction container. In so doing, a secondary solvent [hot water or boiling water] with a predetermined first mass and a primary mixture [tea leaves or tea material] consisting of a solid, primary solvent [carrier medium] and a transition component [theine and other desirable and undesirable accompanying materials] with a predetermined second mass are brought into contact with each other for a predetermined dwell time [brewing time] to obtain the extract. After the dwell time, the obtained extract and a complementary portion of raffinate (=primary solvent after extraction) [extracted tea leaves] are separated from each other.

The underlying object of the invention is achieved according to the method when the following method steps, (i) to (v), are provided in the method of the generic type.

In the method, the basic inventive concept substantially consists on the one hand of not subjecting the primary mixture [tea leaves] to spatial constraints during extraction to solve the proposed object with regard to improving the exchange of substances during extraction. This means that the primary mixture is not extracted in a spatially limited volume (for example such as perforated boundary walls, permeable bags, sacks and sieve contains). The primary mixture [tea leaves] can accordingly be held in suspension in the secondary solvent; consequently its swelling behavior is not restricted, penetration by a secondary solvent is facilitated, and the exchange of substances is accordingly enhanced in comparison to extraction in a so-called fixed bed.

According to an advantageous embodiment of the method, the primary mixture is not introduced as a whole as the predetermined second mass, but rather more or less in very small portions, or respectively minimum individual portions, and continuously over a predetermined dosing time into the secondary solvent added to the extraction container in proportion of the first mass. The dosing time must be much shorter than the dwell time in order to ensure a very narrow dwell time spectrum for all portions of the primary mixture.

On the other hand, to achieve the object addressed in regard to the controlled dehumidification of the raffinate with residual moisture [extracted tea leaves with residual moisture] to the basic inventive concept consists of further treating the two mixture components available after extraction, namely a mixture consisting of extract and raffinate, at least such that the residual moisture consisting of the extract is at least partially removed from the complementary portion in the form of a raffinate with residual moisture [extracted tea leaves with residual moisture] by dehumidification and is supplied to the already segregated extract.

One embodiment of the method provides that the raffinate with residual moisture is supplied mechanical energy in the broadest sense. This can for example be vibrations, or shaking, or pressure surges from a compressed gas supplied in pulses and if applicable intermittently to which the raffinate to be treated is subjected. Furthermore over the course of dehumidification, balancing of the degree of dehumidification is carried out, or respectively the degree of dehumidification is determined by comparing the mass flows of the substrate before and after the dehumidification step, wherein the particular mass flows are ascertained. The degree of dehumidification is controlled by a feedback control intervention in the determined first mass flow of a mixture [tea concentrate+extracted tea leaves] discharged from the extraction container after extraction, and/or in the supply of mechanical energy. The control intervention and the necessary control-related determinations can be cycled in finite time spans or in infinitesimal time spans. The control intervention can be supported by the determined data that are obtained from the treated substrate simultaneously before and after the dehumidification step, or from the same flowing substrate before and after the dehumidification step.

Method

Step (i): Provide the first mass of secondary solvent [hot water or boiling water] in the extraction container.

The extraction container is quickly filled.

Step (ii): Add the specified second mass of primary mixture [tea leaves] without spatial constraints to the provided first mass of secondary solvent [hot water or boiling water], and distribute in and mix with the first mass.

What is understood by the "predetermined second mass without spatial constraints" has already explained above. The second mass is smoothly and gently supplied by expediently adding a suitable amount of water to the second mass to more or less prepare a sludge that permits easy and gentle conveyance, preferably by means of a product-friendly, rotating displacement pump.

According to an advantageous embodiment of the method, the predetermined second mass is not added completely but rather in portions and continuously to the secondary solvent.

The second mass is supplied as already suggested, either after step (i) or during step (i).

In particular a homogeneous distribution state is envisioned and achieved by the distribution and mixing, wherein it is essential to the invention for the primary mixture to be held in suspension in the secondary solvent. This distribution state and the thereby improved swelling behavior of the primary mixture also includes an enhancement of the exchange of substances in a mixture generated in this manner during the dwell time by the relative movement between the secondary solution and primary mixture. The relative movement is either a movement of the primary mixture [tea leaves] in the secondary solvent [hot water or boiling water], or a circulation of the primary mixture through the secondary solvent, or an overlapping of both forms of movement. The relative movement is preferably generated by a mechanical and/or fluid mechanical stirring action. It has been proven that the primary mixture held in suspension swells more strongly than in a fixed bed, whereby more efficient extraction occurs in comparison to the fixed bed.

Step (iii): Discharging a mixture consisting of the extract [tea concentrate] and the raffinate (=primary solvent after extraction) [extracted tea leaves] from the extraction container.

The mixture is discharged according to a first advantageous version of the method by avoiding forced conveyance solely by means of gravity as a consequence of a feed height of the drainage connection of the extraction container relative to a target location for the mixture. A second version of the method provides in this regard that the discharge of the mixture is also supported by applying a gas pressure of a gaseous propellant to a free surface of the mixture. This also ensures ongoing product-friendly conveyance.

Step (iv): Separating the mixture discharged according to step (iii) into a raffinate with residual moisture [extracted tea leaves with residual moisture] and an extract [tea concentrate freed of extracted tea leaves with residual moisture] released from the raffinate with residual moisture.

The separation of the mixture is preferably accomplished by sieving the raffinate with residual moisture, which also achieves the dehumidification provided according to step (v) when mechanical energy in the broadest sense is applied to the substrates to be treated while sieving.

Step (v): Further treatment of the raffinate with residual moisture at least such that the residual moisture consisting of the extract is at least partly removed from the raffinate with residual moisture by dehumidification and is supplied to the already segregated extract. By the dehumidification, the yield of extract by the method according to the invention, and therefore its cost-effectiveness, is increased.

With regards to the dehumidification according to the invention, the method is realized by the following steps.

Step (vi): Dehumidifying the raffinate with residual moisture [extracted tea leaves with residual moisture] to an established, tolerable portion of extract [tea concentrate] in the raffinate with residual moisture by adding mechanical energy to the raffinate with residual moisture.

The tolerable portion of extract is established depending on the primary mixture that is used [tea leaves, or respectively tea raw material]. This establishment helps control the extent of dissolving, or respectively the yield of valuable and desirable contents from the raffinate with residual moisture, and it helps avoid or at least reduce the dissolving, or respectively the yield of worthless and undesirable contents. The dehumidification is achieved in a surprisingly easy manner by supplying mechanical energy in the broadest sense to the substrate to be treated such as vibrations, or shaking, or pressure surges by pneumatic means.

Step (vii): Determining a first mass flow of the mixture discharged according to step (iii) [tea concentrate+extracted tea leaves], and a second mass flow of the extract freed from raffinate with residual moisture [tea concentrate freed from extracted tea leaves with residual moisture] obtained according to steps (iv, v), in each case over a span of time.

The mass flow is expediently determined in a specified, preferably finite or also infinitesimal time span using a mass flow meter so that corresponding masses, or correspondingly mass differences, can also be calculated from the determined mass flows.

Step (viii): Determining the degree of dehumidification by comparing the first mass flow with the second mass flow, wherein the mass difference resulting therefrom in the time span before and after humidification is compared with a mass difference arising with complete dehumidification that corresponds to the mass of the primary solvent before extraction within the relevant time span.

Balancing, or respectively comparing the mass flows, or respectively the mass differences in the time span before and after dehumidification, indirectly provides the degree of dehumidification of the raffinate with residual moisture [extracted tea leaves with residual humidity]. With complete dehumidification, a mass difference would arise that corresponds to the mass of the primary solvent before extraction [carrier material without theine and other desirable and undesirable accompanying substances before extraction]. The mass of the primary solvent is to be determined from the first mass flow, assuming a homogeneous distribution of the primary mixture in the secondary solvent. The transition component [theine and other desirable and undesirable accompanying substances before extraction] that is contained in the primary mixture [tea leaves] can be neglected in good approximation in the comparison. In the event that the primary mixture is supplied as a sludge, simply take into account the addition of water in the above balance.

Step (ix): Controlling the degree of dehumidification carried out according to step (v; vi) by the feedback control intervention to the first mass flow and the supply of mechanical energy.

If deviations are found from the established, tolerable portion of extract, these deviations are then compensated according to the invention by changing the first mass flow that is continuously determined, and/or by the supply of mechanical energy.

An advantageous embodiment of the method is characterized by the following method steps:

Step (x): controlling the first mass flow depending on the raffinate with residual moisture [extracted tea leaves with residual moisture] such that, when the tolerable portion is exceeded, the first mass flow is reduced while the supply of mechanical energy remains the same, or the supply of mechanical energy is increased while the first mass flow remains the same, or the first mass flow is reduced, and the supply of mechanical energy is simultaneously increased until the tolerable portion rises in response to these selected control measure(s).

Another embodiment of the method provides that the tolerable portion determined in step (vi) correlates with other control parameters that are determined with the following method steps (the necessary calculation equations will be specifically indicated below in the context of an exemplary embodiment):

Step (xi): determining a first differential mass of the raffinate with residual moisture [extracted tea leaves with residual moisture] from the first and second mass flow determined according to step (vii);

Step (xii): determining a second differential mass of the primary mixture [tea leaves] from the first mass flow determined according to step (vii), and by using a specified concentration that results from the second mass relative to the first mass plus the second mass; and Step (xiii): determining a tolerable first differential mass of the raffinate with residual moisture [tolerable first differential mass of the extracted tea leaves with residual moisture] according to the first differential mass determined according to step (xi), and the second differential mass determined according to step (xii) by using the tolerable portion that is defined on the one hand as the quotient from the difference between the tolerable first and the second differential mass, and on the other hand from the difference between the first and the second differential mass.

From the first mass flow, due to the specified, homogeneous concentration, the mass of tea leaves (relative to the state before extraction and before being added to hot water or boiling water) is known that is contained, or respectively must be contained, in the first mass flow over the time span. By the proposed balancing of the first and the second mass flow over the time span, the actual value of a mass of tea leaves with residual moisture, or respectively the first differential mass, is determined that arises during dehumidification. From this information, the momentary portion of tea concentrate in the extracted tea leaves with residual moisture is determined. This portion should be reduced according to the invention to the established, tolerable or respectively desirable portion of tea concentrate by controlling.

According to one proposal, the dehumidification performed according to step (v) is performed at the same time as or after the separation of the mixture performed with step (iv). Subsequently according to another proposal, all of the obtained extract [tea extract] is subjected to filtering to segregate undesirable fine and very fine particles. It has proven to be useful when the filtering comes before preliminary clarification by separation in a centrifugal field, which significantly increases the service life of a filter apparatus for performing the filtering. For product-friendly treatment, it is moreover proposed that the mixture discharged according to step (iii) is discharged solely under the effect of gravity. To accelerate the draining process while ensuring product-friendly treatment, it is proposed that the discharging of the mixture is additionally supported by applying pressure from a gaseous propellant to a free surface of the mixture.

A first method with regards to the mode of operation of the extraction container provides that the part of the method defined by steps (i and ii) is performed at least in a first extraction container that differs from a second or a third extraction container, and that is designed as a discontinuously working homogeneous reaction container. To ensure a desirable mass ratio of the second mass to the first mass, the entire second mass is supplied to the first mass. "Entire" in this case means that there is no splitting of the second mass into partial masses and supplying these partial masses to the corresponding partial masses of the first mass located at other places, and the second mass is supplied over a more or less long dosing time and to a single region of the entire first mass at that location.

To increase the production output, more than one first extraction container is operated in parallel and simultaneously, or in parallel and delayed. The further treatment of each obtained mixture is at the same time or delayed in the above described single process line according to steps (iii to v).

A second method with regards to the mode of operation of the extraction container provides that the part of the method defined by steps (i and ii) is performed at least in one second extraction container that differs from a first or a third extraction container, and that is designed as a discontinuously working homogeneous reaction container. The second mass is divided into a finite number of second partial masses and, in so doing, into at least two second partial masses. The second partial masses are supplied separate from each other to corresponding first partial masses of the first mass to ensure a desirable mass ratio of the second mass to the first mass.

The second method reduces the time for filling with tea leaves corresponding to the number of second partial masses while ensuring desired product-friendly treatment and high-quality with respect to maintaining a specified dwell time (brewing time).

With regards to the mode of operation of the extraction container, a third method provides that the part of the method defined by steps (i and ii) is performed in and with a third extraction container that differs from a first or second extraction container (10; 100), and wherein the first mass added according to step (i) that is preferably supplied via the top area of the third extraction container is discharged during the dwell time in the form of a plug flow oriented vertically in the direction of gravity. In so doing, the first mass is forcibly discharged, and a mass flow of the second mass is continually added to a forcibly generated mass flow of the first mass such that a desired mass ratio of the second mass to the first mass is ensured in the obtained mixture consisting of the primary mixture and secondary solvent. The mixture consisting of the primary mixture and secondary solvent is supplied from above into a free surface of a mixture located in the third extraction container. Accordingly, the mixture consisting of the primary mixture and secondary solvent flows toward the free surface to the extent that secondary solvent leaves the third extraction container through its drainage connection during the dwell time. The dosing of the second mass into the first mass ends when the mixture first supplied to the third extraction container has flowed as a mixture from top to bottom through the third extraction container in the form of the plug flow after the expiration of the dwell time. Then the method is continued according to steps (iii to v).

In contrast to the first and second method, the third method realizes a more or less continuous method with a very precise adjustment and maintenance of the desired dwell time, or respectively brewing time. The formation of a plug flow is enhanced when the third extraction container has a slim geometry, i.e., when its liquid-impacted height is a multiple of its diameter, or respectively its dimensions transverse to its height. In a borderline case, a design in this regard leads to a flow tube with corresponding dwell time behavior.

The device according to the invention for performing the method according to the invention to control the production of an extract by means of solid-liquid extraction using an extraction container is based on an extraction container that has at least one first inner region. In a top region, this first inner region possesses a first supply connection for supplying a primary mixture and, in a bottom region, a drainage connection for the complete drainage of a mixture consisting of an extract and a raffinate. In a top region, the extraction container possesses a supply connection for supplying a secondary solvent. The drainage connection discharges into a drain line that, relative to the direction of gravity, is at a distance by a supply height from the drainage connection.

Viewed in the direction of flow, the drain line has a control valve for changing a mass flow flowing through the control valve, a first mass flow meter for determining a first mass flow for the mixture, a separating device for separating the mixture into the extract and a raffinate with residual moisture, a dehumidifying apparatus for dehumidifying the raffinate with residual moisture, and a second mass flow meter for determining a second mass flow for an extract freed from raffinate with residual moisture. The separating device and dehumidifying apparatus are realized in the form of a controllable vibration or shaking sieve. Moreover, a control apparatus is provided that, in terms of signaling, is at least connected to the control valve, the first and the second mass flow meters, and the vibration or shaking sieve, and that controls the degree of dehumidification by a feedback control intervention in the first mass flow and the supply of mechanical energy.

With regards to fast separation and sufficient dehumidification, it is particularly useful when the separating device and dehumidifying apparatus are realized in the form of a controllable vibration or shaking sieve. In this case, two procedural measures, i.e., separation and dehumidification, are performed effectively and efficiently in a single assembly. The sieve openings are dimensioned such that the raffinate [extracted tea leaves] is separated to a sufficient extent from the extract [tea concentrate].

Because sieves have a separation limit with respect to the particles to be separated, these particles that pass through the sieve openings and are generally undesirable impair the extract and must be segregated in another treatment step. For this purpose, it is provided that, viewed in the direction of flow, a filter apparatus is arranged after the second mass flow meter in the drain line.

Because the filter apparatus is to preferably perform a final clarification of the extract, i.e., segregation of fine and very fine particles, larger particles that pass through the sieve openings impair the service life of the filter apparatus. To avoid this, an advantageous embodiment of the device provides that, viewed in the direction of flow, the filter apparatus is upstream from a centrifugal separator that provides preliminary clarification of the extract.

The device according to the invention is alternatively equipped with three differently designed extraction containers, wherein at least one first extraction container is designed as a discontinuously working homogeneous reaction container that in the top region of a single first inner region has a single first supply connection, and in the bottom region of the first inner container has a single drain connection. The first extraction container possesses the supply connection in the top region To reduce the time for filling the extraction container with the primary mixture [tea leaves] and thereby at least retain the yield of extract with at least the same high quality, the invention proposes at least one second extraction container that is designed as a discontinuously working homogeneous reaction container, and that has at least one second inner region above the first inner region and directly adjacent thereto. Each additional inner region is arranged above the preceding inner region and directly adjacent thereto. Moreover, each inner region above the first inner region is assigned another first supply connection for the primary mixture. Each additional first supply connection is assigned another drainage connection below and at a distance therefrom such that the mixture obtained in the respective assigned inner region is discharged as unadulterated as possible from the primary mixture that is supplied to the adjacent inner region below via the assigned first supply connection. The second extraction container possesses the supply connection in the top region. The aforementioned inner regions extend over the height of the second extraction container. They are not separated from each other by any type of fixtures, but are only more or less separated from each other in terms of flow by the particular guidance of flow according to the invention in their region, wherein a limited mixing movement can occur beyond the imaginary boundaries between the inner regions.

It is moreover proposed that the first supply connection and each additional first supply connection are each connected to a product-friendly rotating delivery apparatus.

A more or less continuous extraction method is realized when the device according to the invention is equipped at least with third extraction container, from which a circulating line branching from a drain line runs.

This third extraction container has a supply line for supplying a secondary solvent [hot water or boiling water], or a mixture consisting of a primary mixture [tea leaves] and secondary solvent. The supply line enters through a third foot area into the third extraction container, penetrates it up to a third headspace, and discharges there via an outlet.

The third extraction container has a drainage connection for draining the secondary solvent or a mixture [tea concentrate+extracted tea leaves] consisting of an extract [tea concentrate] and a raffinate [extracted tea leaves], wherein the drainage connection leaves the foot area and transitions there into the drain line.

Viewed in the direction of flow and at a vertical distance in the direction of gravity by a supply height from the drainage connection, the drain line has a control valve, a first mass flow meter for determining a first mass flow for the mixture, a separating device for separating the mixture into the extract and a raffinate with residual moisture [extracted tea leaves with residual moisture], a dehumidifying apparatus for dehumidifying the raffinate with residual moisture, and a second mass flow meter for determining a second mass flow for an extract freed from raffinate with residual moisture [tea concentrate freed from extracted tea leaves with residual moisture].

The separating device and dehumidifying apparatus are realized in the form of a controllable vibration or shaking sieve.

Upstream from the control valve, the circulating line branches at a branching point from the drain line and joins the supply line at a joining point, and is flowed through from the branching point to the joining point.

Provided inside the circulating line, relative to the branching point, are first a pump for conveying the secondary solvent and then a dosing apparatus for dosing primary mixture into the secondary solvent.

A control apparatus is provided that, in terms of signaling, is at least connected to the control valve, the first and the second mass flow meters, and the vibration and shaking sieve, and that controls the degree of dehumidification by a feedback control intervention in the first mass flow and the supply of mechanical energy.

Several of the first, second, or third extraction containers can be operated parallel and simultaneously or in a temporal sequence one after the other, and the obtained mixture can be discharged into the process line operated according to steps (iii) to (v).

To support the generation of a plug flow directed from top to bottom viewed in the direction of gravity, in particular in the startup mode of the third extraction container, but also in its continuous and/or shutdown mode, an embodiment of the third extraction container provides that at least two third stirring apparatuses are provided in a liquid-impacted outer region of the third headspace at the edge. These are preferably arranged evenly distributed over this outer region and, due to their particular installation position, are able to generate a flow movement directed toward the center of the third extraction container with a downwardly oriented flow component.

A formation of the plug flow that is as undisturbed as possible is ensured by another embodiment of the third extraction container in that the drainage connection is arranged centrally and at the bottom end of the third extraction container, and the supply line runs concentrically through the drainage connection.

It is moreover proposed that the dosing apparatus is connected to a rotating displacement pump, whereby the primary mixture [tea leaves] is kept almost completely free from mechanical and/or fluid mechanical stresses, and is thereby treated in a product-friendly manner.

To accelerate the discharging of the mixture [tea concentrate+extracted tea leaves] while retaining the principle of product-friendly discharge, it is provided that the first, second and third extraction containers each have a supply connection for supplying a compressed gas in the region of its top end.

BRIEF DESCRIPTION OF THE DRAWINGS

The invention is represented in more detail by the following description and the appended figures of the drawing and the claims. The invention can be realized in a wide range of embodiments of a method for controlling the production of an extract by means of solid-liquid extraction of the generic type and by means of respective three differently designed extraction containers. Moreover, the invention is realized in a very wide range of embodiments of a device for performing the aforementioned particular method. In the following, the method and the device will be described with reference to the drawing, in connection with one of the three extraction containers and illustrated by the preferred exemplary embodiment for controlling the production of a tea extract.

DETAILED DESCRIPTION

General

Initially a few basic notes are offered in advance to help understand the following symbols for illustrating solid-liquid extraction, or respectively solid-liquid hot extraction (with regard to the following and also preceding notation: 1. terms for the generic case comes first; and 2. [production of tea concentrate] comes second).

A solid-liquid extraction exists for example when tea concentrate is extracted from tea leaves with the assistance of water. Extraction is therefore not complete decomposition, because only one of the components to be separated is in an approximately pure state; the others are only relocated and are present in a mixture after the extraction.

The following notation used at a few places, such as: m(A∞B) is to be understood as m=f((A∞B)); and (M+m)((C∞B)+A) is to be understood as (M+m)=f ((C∞B)+A) (analogous to the mathematical notation of y=f(x), or respectively y(x)).

A feed mixture (A∞B) is termed "primary mixture" [tea leaves], and a solution generated by extraction is termed "secondary mixture" or extract (C∞B) [tea concentrate], wherein the notation (A∞B), or respectively (C∞B), designates the phase "mixture", or respectively "solution". A substance transitioning from one phase to the other is termed a "transition component" [theine and other desirable or undesirable accompanying substances] that in the following will be identified as B. A non-transitioning component of the primary mixture is a "primary solvent" or a carrier material A [carrier material before extraction]. After extraction, it occurs in a nearly pure state as a "raffinate" [extracted tea leaves] whereas the extract (C∞B) [tea concentrate] is composed of a secondary solvent C [water; hot extraction: hot water or boiling water→reduced hereinafter to hot water] and the transition component B [theine and other desirable or undesirable accompanying substances]. The above solid-liquid extraction or solid-liquid hot extraction can be depicted as follows using the above symbols by the following scheme (1) (see also FIGS. 1 to 4):

$$(A\infty B)+C\rightarrow(C\infty B)+A \tag{1}$$

wherein the term (A∞B)+C will hereinafter be termed a mixture (of the primary mixture and secondary solvent) [mixture (of tea leaves and hot water)], and the term (C∞B)+A will hereinafter be termed a mixture (of extract+ raffinate after extraction) [tea concentrate+extracted tea leaves].

Figure 1:
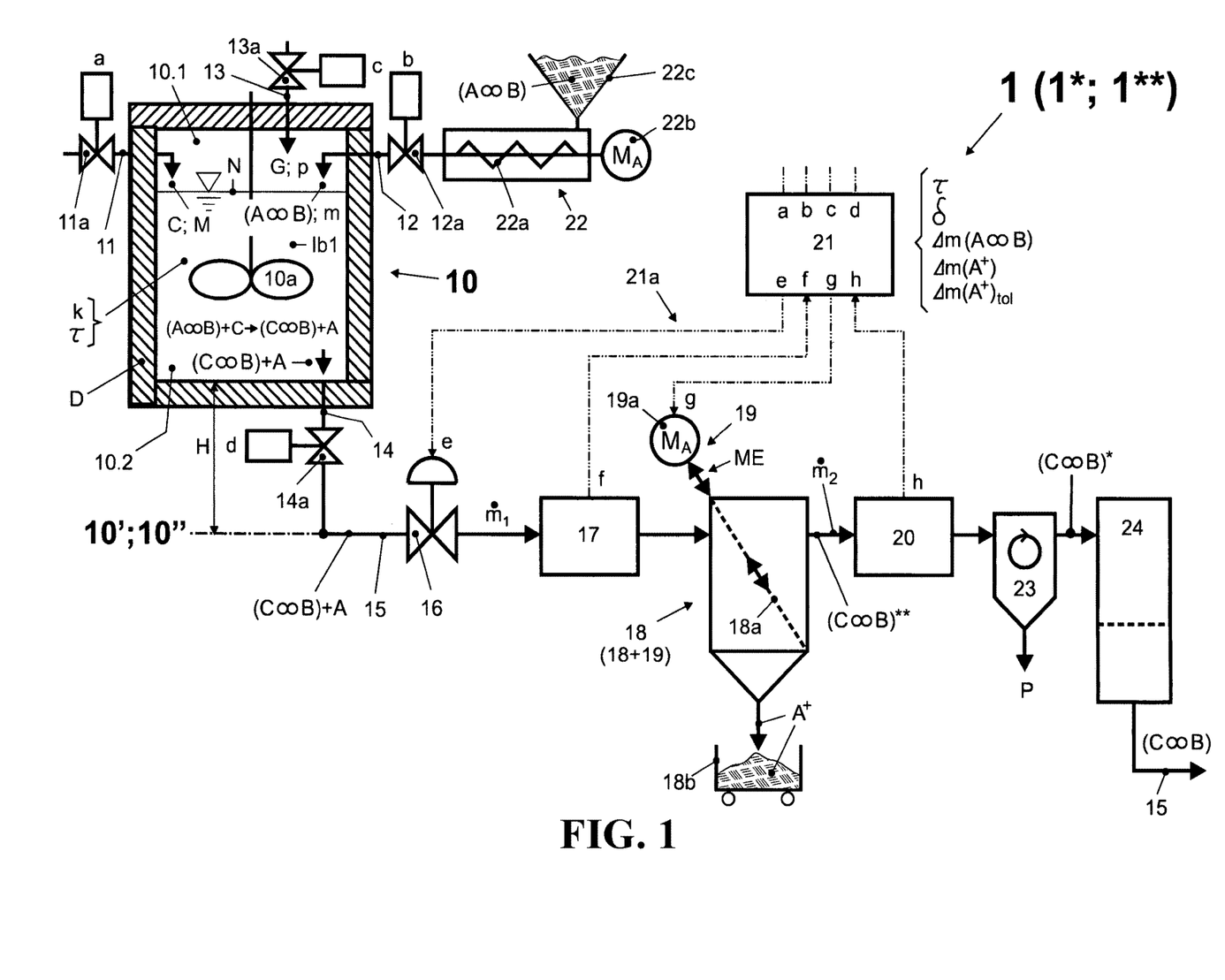
FIG. 1 shows a schematic representation of a first device with a first extraction container.

First Device (FIG. 1)

A first device 1 for controlling the production of an extract by means of solid-liquid extraction, in particular solid-liquid hot extraction, by means of a first extraction container 10 according to the invention is shown in FIG. 1.

The first extraction container 10 has a single and first inner region Ib1 that, in a top region, a first headspace 10.1, possesses a single supply connection 11 with a supply valve 11a for supplying a secondary solvent C, which is provided with a predetermined first mass M in a first inner region Ib1 where the first inner region Ib1 forms a free surface N. Moreover, a first supply connection 12 with a first supply valve 12a is provided in the first headspace 10.1 for supplying a primary mixture (A∞B) [tea leaves], which is added with a predetermined second mass m of the first mass M to a corresponding mixture (A∞B)+C [mixture of tea leaves and hot water]. A first foot area 10.2 of the first extraction container 10 has a single drainage connection 14 with a drain valve 14a for completely discharging a mixture (C∞B)+A consisting of an extract (C∞B) and a raffinate A. Moreover, at the top end of the first headspace 10.1, a supply connection 13 with a supply valve 13a is provided for supplying a gas propellant, a compressed gas G, with a gas pressure p.

The first extraction container 10 possesses insulation D for thermal insulation against its environment, and a first stirring apparatus 10a that ensures an as homogeneous as possible, but always product-friendly even distribution of the substrate located therein in the discontinuously working homogeneous reaction container. The first supply connection 12 is connected to a product-friendly, preferably rotating delivery apparatus 22. The delivery apparatus 22 preferably has a screw conveyor 22a driven by a drive motor $M_A$, preferably a controllable drive motor 22b. The primary mixture (A∞B) is kept in a storage tank 22c from which the primary mixture (A∞B) runs to the screw conveyor 22a.

The drainage connection 14 discharges into a drain line 15 that, viewed in the direction of flow, has a control valve 16 at a vertical distance from the drainage connection 14 by a supply height H in the direction of gravity. The drain line 15 moreover accommodates a first mass flow meter 17, again viewed in the direction of flow, for determining a first mass flow $\dot{m}_1$ for the mixture, a separating device 18 with a suitable sieve 18a, and a raffinate collecting container 18b for separating the mixture (C∞B)+A into a raffinate with residual moisture $A^+$ [extracted tea leaves with residual moisture] and an extract (C∞B) [tea concentrate freed from extracted tea leaves with residual moisture], freed from raffinate with residual moisture $A^+$, a dehumidification apparatus 19 for dehumidifying the raffinate with residual moisture $A^+$, and a second mass flow meter 20 for determining a second mass flow $\dot{m}_2$ for the extract (C∞B) freed from residual moisture $A^+$.

The separating and dehumidifying apparatus 18, 19 (hereinafter also just sieve 18, 19) can be realized by two separate assemblies or by a single assembly, preferably by a vibrating or shaking sieve 18, 19. When the design is integrated, the sieve 18a is supplied mechanical energy ME by means of a drive motor ($M_A$), preferably a controllable vibration or shaking drive 19a.

The dwell time of the raffinate with residual moisture $A^+$ can be influenced by the angle of the sieve 18, 19, whereby its residual moisture content in turn can be controlled. A greater sieve angle shortens the dwell time and increases the residual moisture content; a lesser sieve angle influences these quantities in reverse. The sieve geometry also has an influence on the throughput of the mixture after extraction. The width of the sieve 18, 19 is determined by the required throughput. An expansion of the sieve width when there is an elevated throughput is necessary to ensure a sufficient distribution of the solid particles on the sieve surface. Lengthening the sieve 18, 19 increases the dwell time of the solid material on the sieve 18, 19 and means a further dehumidification of the raffinate with residual moisture $A^+$ due to a longer treatment. The method according to the invention can therefore be modified inter alia by a modified supply volume of the mixture to the sieve 18, 19, by the angle of the sieve 18, 19, as well as by a change in the sieve geometry.

A control apparatus 21 is provided that is connected in terms of signaling via signal transmission lines 21a at least to the control valve 16, the first mass flow meter 17, the second mass flow meter 20, and the dehumidifying apparatus 19 (signal connections e to h). The valves 11 to 14 are actuated in automatic mode by the control apparatus 21 via signal connections a to d.

Downstream from the second mass flow meter 20 viewed in the direction of flow a filter device 24 is arranged in the drain line 15 for segregating fine and very fine particles from a pre-clarified extract (C∞B)*, wherein the pre-clarified extract (C∞B)* becomes the filtered extract (C∞B) through the filter apparatus 24.

For preliminary clarification of the extract (C∞B) freed from raffinate with residual moisture $A^+$, a centrifugal separator 23 for segregating coarser particles P that have passed through the sieve 18a of the separating apparatus 18 while segregating the raffinate with residual moisture $A^+$ is optionally upstream from the filter apparatus 24, also viewed in the direction of flow. By the centrifugal separator 23, the extract (C∞B) freed from raffinate with residual moisture $A^+$ becomes the pre-clarified extract (C∞B)*, which has the effect of extending the service life of the filter apparatus 24.

Additional first extraction containers 10'; 10" of the above-described type can be connected to the drain line 15 between the drain valve 14*a* and control valve 16 to increase the production output of the first device 1.

Figure 4:
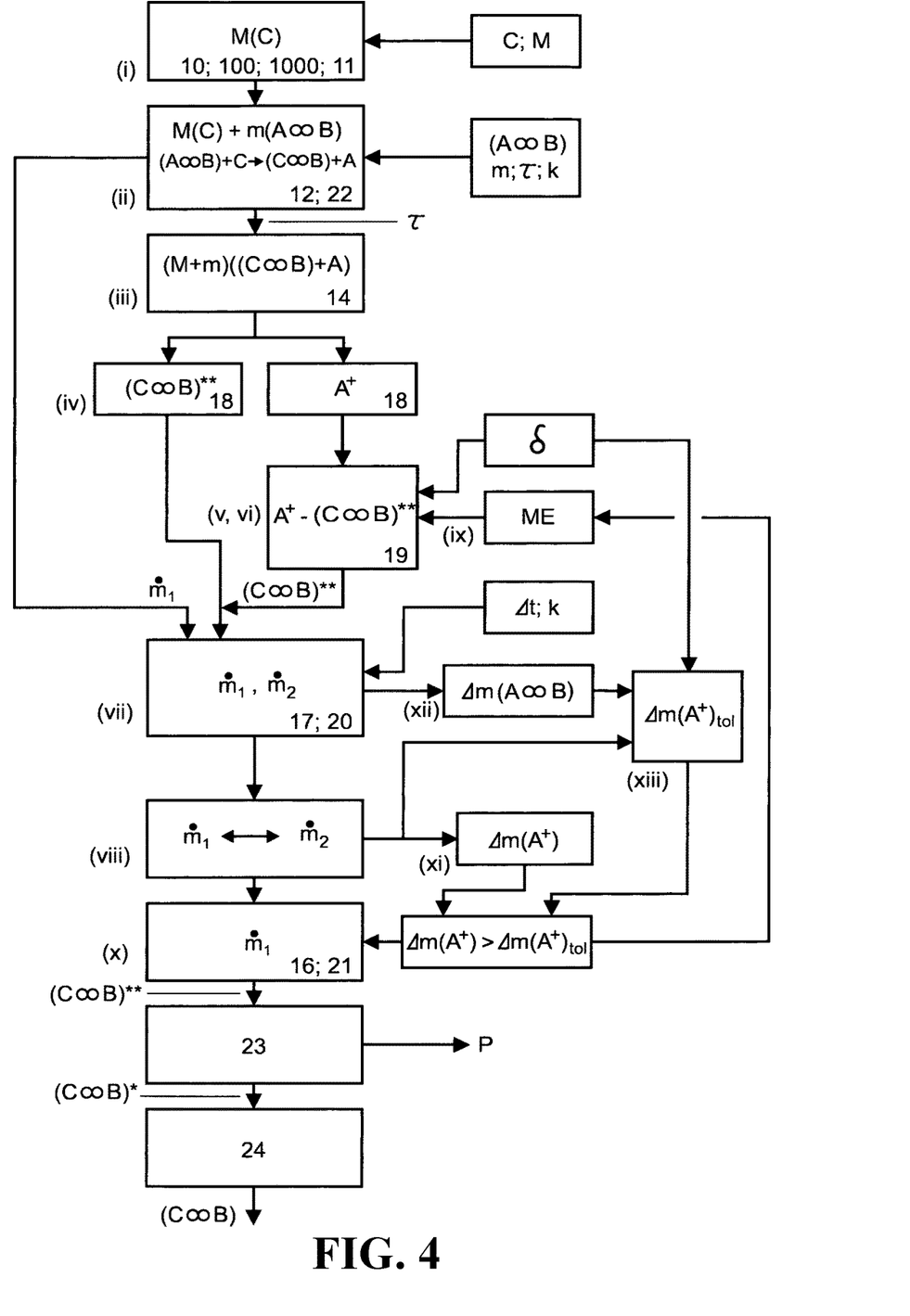
FIG. 4 shows a flow chart of the method that is carried out with each of the devices according to FIGS. 1-3.

First Method (FIGS. 1 and 4)

Just like the second and third methods (FIGS. 2 and 3), the first method is characterized by method steps (i) to (ix) and, in an advantageous embodiment, by method steps (x) to (xiii), which are graphically illustrated in terms of their influential relationship and importance in a flowchart in FIG. 4. The second and the third methods differ from the first method which is carried out using the first extraction container 10 in terms of the treatment of the substrate in the assigned second, or respectively third extraction containers 100, 1000 and the related procedural measures until the mixture is discharged according to step (iii) of the method. The following description of the method is restricted to the terminology for producing tea concentrate as indicated in the list of reference signs for the employed abbreviations in the concordance of superordinate terms.

According to step (i), the first mass M [hot water C] is provided in the first extraction container 10 via the supply connection 11 (FIG. 4: provision of C and M, →M(C); FIG. 1).

According to step (ii), the predetermined second mass m [tea leaves (A∞B)] is added to the provided first mass M without spatial constraints corresponding to a predetermined concentration k=m/(M+m) via the first supply connection 12, distributed in the first mass M by means of the first stirring apparatus 10*a*, mixed as homogeneously as possible with the first mass M, and kept in an exchange of substances with each other by extraction for a predetermined dwell time τ [brewing time] (FIG. 4: specification of (A∞B) and m, →m((A∞B)), k and τ; FIG. 1).

The extraction can be represented by the following scheme (1):

$$(A\infty B)+C\rightarrow(C\infty B)+A \quad (1)$$

The concentration k is defined by equation (4):

$$k = \frac{m}{M+m} = \frac{m(A\infty B)}{M(C)+m(A\infty B)} = \frac{m(A\infty B)}{(M+m)((C\infty B)+A)} \quad (4)$$

According to step (iii), after the dwell time τ, the mixture (C∞B)+A [tea concentrate+extracted tea leaves], with the overall mass M+m, consisting of the extract (C∞B) [tea concentrate] and the raffinate A [tea leaves] is discharged from the first extraction container 10 via the drainage connection 14 (FIG. 4: (M+m)((C∞B)+A); FIG. 1).

According to step (iv), the mixture (C∞B)+A discharged after step (iii) is separated into a raffinate with residual moisture $A^+$ [extracted tea leaves with residual moisture] and an extract (C∞B) [tea concentrate freed from extracted tea leaves with residual moisture $A^+$] freed from raffinate with residual moisture $A^+$ by means of the separating device 18 (FIG. 4; FIG. 1**).

According to step (v), a further treatment of the raffinate with residual moisture $A^+$ is at least provided in that the residual moisture consisting of extract is at least partially removed by dehumidification from the raffinate with residual moisture $A^+$ and supplied to the already segregated extract (C∞B)** freed from raffinate with residual moisture $A^+$.

According to step (vi), the raffinate with residual moisture $A^+$ is dehumidified in the dehumidification device 19, namely to an established, tolerable portion δ of extract (C∞B) in the raffinate with residual moisture $A^+$ by supplying mechanical energy (ME) to the raffinate with residual moisture $A^+$. The extract (C∞B) additionally obtained thereby is supplied to the extract (C∞B) freed from raffinate with residual moisture $A^+$ obtained according to step (iv) (FIG. 4; specification of δ and ME; FIG. 1**).

According to step (vii), the following are determined: the first mass flow $\dot{m}_1$ of the mixture (C∞B)+A discharged according to step (iii) by the mass flow meter 17, and the second mass flow $\dot{m}_2$ of the extract (C∞B) obtained according to steps (iv) and (v) and freed from raffinate with residual moisture $A^+$ by the second mass flow meter 20, in each case in a finite time span Δt or an infinitesimal time span dt (FIG. 4: specification of Δt, k; FIG. 1**).

According to definition equation (3)

$$\Delta m(A\infty B)=\dot{m}_1 \Delta t k \quad (3)$$

a second differential mass Δm(A∞B) of the primary mixture (A∞B) can be determined according to step (xii) with the specification data for Δt, k.

According to step (viii), the degree of dehumidification is determined by comparing the first mass flow $\dot{m}_1$ with the second mass flow $\dot{m}_2$ (FIG. 4; FIG. 1). According to balance equation (2)

$$\Delta m(A^+)=(\dot{m}_1-\dot{m}_2)\Delta t; \quad (2)$$

a first differential mass $\Delta m(A^+)$ of the raffinate with residual moisture $A^+$ can be determined according to step (xi) with the specification data for Δt, $\dot{m}_1$, $\dot{m}_2$.

According to step (ix), the degree of dehumidification carried out according to step (v; vi) is controlled to the first mass flow $\dot{m}_1$ by the feedback control intervention and/or the supply of mechanical energy ME. This is specifically accomplished in that, from the first differential mass $\Delta m(A^+)$ and second differential mass Δm(A∞B) determined according to steps (xi) and (xii), according to step (xiii) a tolerable first differential mass $\Delta m(A^+)_{tol}$ of the raffinate with residual moisture $A^+$ can be calculated using the definition equation (5) for the tolerable portion δ of extract (C∞B)** in the raffinate with residual moisture $A^+$ to be specified, namely $$\delta = \frac{\Delta m(A^+)_{tol} - \Delta m(A\infty B)}{\Delta m(A^+) - \Delta m(A\infty B)}. \quad (5)$$

The tolerable portion δ is then used in the comparison with the first differential mass $\Delta m(A^+)$ of the raffinate with residual moisture $A^+$ for controlling when it is revealed that $\Delta m(A^+) > \Delta m(A^+)_{tol}$ (FIG. 4; FIG. 1).

The tea concentrate (C∞B) freed from extracted tea leaves with residual moisture $A^+$ is usefully pre-clarified in the centrifugal separator 23 by segregating particles P below the separating limit of the sieve 18***a*, and then supplied as a pre-clarified tea concentrate (C∞B)* to the filter apparatus 24. The filter apparatus 24 then leaves as a filtered tea concentrate (C∞B) in order, for example, to be further treated to become a tea beverage.

The above-described first method is carried out over the course of steps (i) and (ii) in the first extraction container 10 that is designed as a discontinuously working homogeneous reaction container. To ensure a desired mass ratio of the second mass m to the first mass M, namely k=m/(M+m), in the first extraction container 10, the second mass m is supplied completely via the first supply connection 12 to the first mass M.

An extraction by means of the first device 10 is documented using the following process data:
- first mass M (1000 L water) with an initial temperature of 84° C.;
- second mass m=20 kg tea;
- filling time 4.5 min for the first and the second mass M, m;
- Turn on a two-disc agitator (first agitator 10*a*) with a rotational speed of 50 RPM at the beginning of introducing the tea;
- the vibration sieve 18, 19 is started up after 5 minutes of brewing;
- after another 30 s, the drain valve 14*a* is opened, and the mixture leaves the extraction container 10 at a flow speed of 18,000 L/h;
- the duration of the vibration process is 3.5 min; and
- the yield is 880 L extract.

Figure 2:
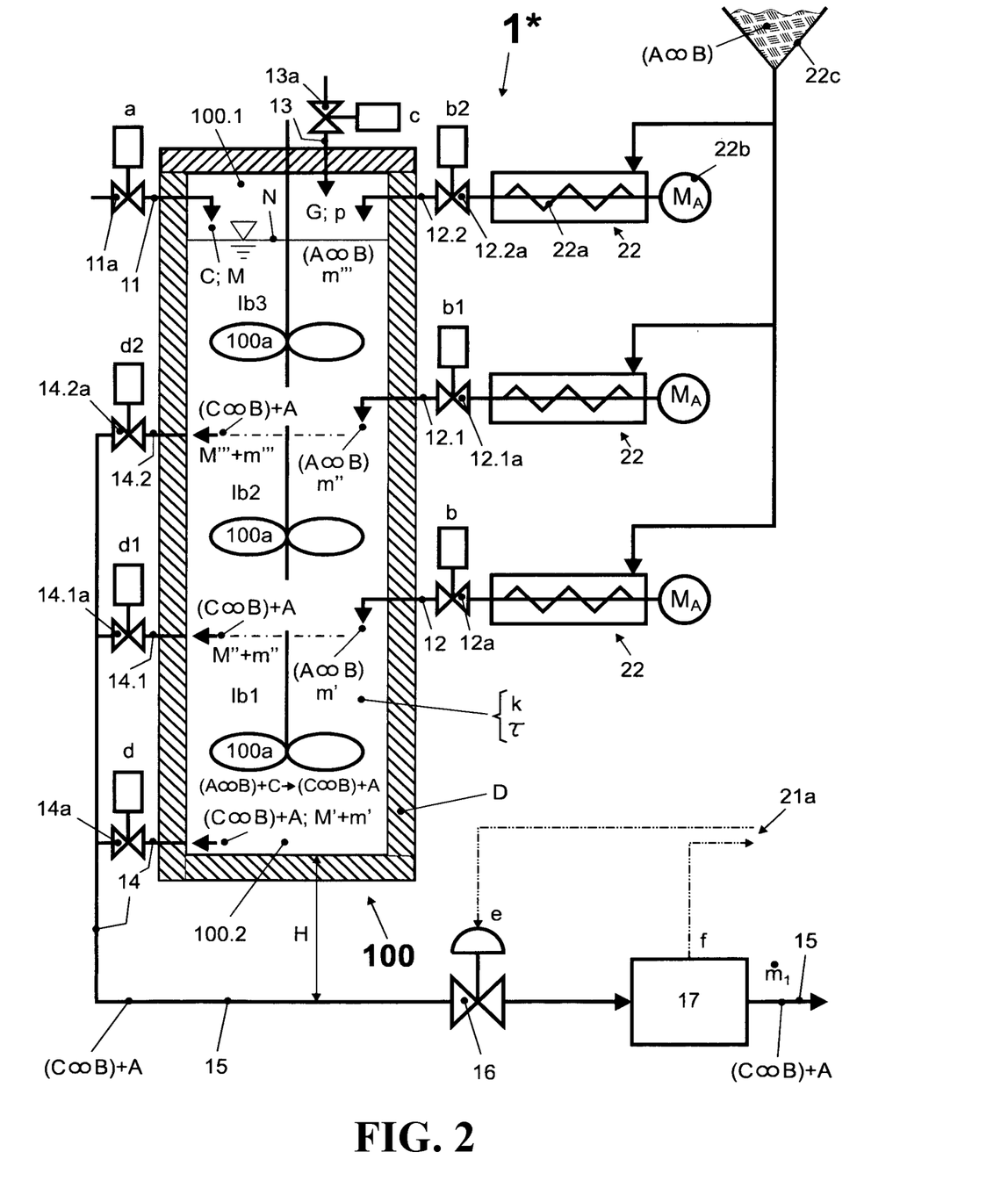
FIG. 2 shows a schematic representation of a second device with a second extraction container.

Second Device (FIG. 2)

A second device 1* according to the invention for controlling the production of an extract by means of solid-liquid extraction, in particular solid-liquid hot extraction, by means of a second extraction container 100 according to an embodiment the invention is shown in FIG. 2.

Just like the first extraction container 10, the second extraction container 100 is designed as a discontinuously working homogeneous reaction container that however, in contrast to the first extraction container 10, has at least one second inner region Ib2 above the first inner region Ib1 (with the first supply connection 12, the first supply valve 12*a*, the drainage connection 14 and the drain valve 14*a*) and directly adjacent thereto. Each additional inner region Ib3, . . . , Ibn, where n means a finite number, is arranged above the preceding inner region Ib2, . . . , Ib(n−1), and directly adjacent thereto. Moreover, each inner region Ib2, Ib3, . . . provided above the first inner region Ib1 is assigned another first supply connection 12.1, 12.2, . . . for the primary mixture (A∞B) [tea leaves] with an additional first supply valve 12.1*a*, 12.2*a*, . . . . Each additional first supply connection 12.1, 12.2, . . . is assigned another drainage connection 14.1, 14.2, . . . below and at a distance therefrom with another drain valve 14.1*a*, 14.2*a*, . . . such that the mixture (C∞B)+A [tea concentrate+extracted tea leaves] obtained in the respective assigned inner region Ib2, Ib3, . . . is discharged as unadulterated as possible from the primary mixture (A∞B). The mixture (C∞B)+A flows to the adjacent inner region Ib1, Ib2, . . . below via the assigned first supply connection 12, 12.1, . . . .

A second foot area 100.2 of the second extraction container 100 has the drainage connection 14 with the drain valve 14*a* for completely discharging the mixture (C∞B)+A from the bottommost, first inner region Ib1. Moreover, at the top end of a second headspace 100.1, the supply connection 13 with the supply valve 13*a* is provided for supplying the compressed gas G with the gas pressure p.

Via the only supply connection 11 with the supply valve 11*a* that is located in the top region of the second extraction container 100, the secondary headspace 100.1, the secondary solvent C with the predetermined first mass M is added to the provided inner regions Ib1, Ib2, Ib3, . . . . The free surface N forms in the secondary headspace 100.1 in the topmost inner region.

Corresponding to a number n of inner regions Ib1 to Ibn, the first mass M is proportionately distributed to these inner regions. Generally, equivalent portions M/n can be assumed in these inner regions, which are designated in FIG. 1 with n=3 inner regions, each with a first partial mass M', M" and M''' (in this case M/3).

Via the first supply connection 12 and the additional first supply connections 12.1, 12.2, . . . , the primary mixture (A∞B) [tea leaves] with the predetermined second mass m is added proportionately to the added first mass M, wherein each first partial mass M', M", M''' of the added first mass M has a correspondingly equivalent portion m/n (in this case m/3) that is designated in FIG. 2 as the second partial mass m', m", m'''.

The second extraction container 100 possesses insulation D for thermal insulation against its environment, and a second stirring apparatus 100*a* that can be of such a nature that it can ensure a very homogeneous but always product-friendly even distribution of the substrate located therein in each of the inner regions Ib1, Ib2, and Ib3 of the discontinuously working homogeneous reaction container. The first supply connection 12, and all the additional first supply connections 12.1, 12.2, . . . are each connected to a product-friendly, preferably rotating delivery apparatus 22. The delivery apparatus 22 preferably has a screw conveyor 22*a* that is driven by a drive motor MA, preferably a controllable drive motor 22*b*. The primary mixture (A∞B) is preferably kept in a single storage tank 22*c* from which the primary mixture (A∞B) runs to the respective screw conveyor 22*a*.

The drainage connection 14 discharges into the drain line 15 that, viewed in the direction of flow, joins the control valve 16 at a vertical distance from the drainage connection 14 by a supply height H in the direction of gravity. The drain line 15 continues from there into the second device 1*. This part of the second device 1* is identical with the corresponding part of the first device 1.

Second Method (FIG. 2)

The second method is carried out over the course of steps (i) and (ii) in the second extraction container 100 that is designed as a discontinuously working homogeneous reaction container. The second mass m is divided into a finite number n of second partial masses m', m", . . . , and in so doing into at least two second partial masses m', m", . . . , and the second partial masses m', m", . . . are each supplied separate from each other to corresponding first partial masses M', M", . . . to ensure a desired mass ratio of the second mass to the first mass (concentration k=m/(M+m)) via the first supply connection 12 and additional first supply connections 12.1, 12.2, . . . . Each of these first supply connections can be assigned a delivery apparatus 22. However, a single delivery apparatus 22 can supply the first supply connections 12.1, 12.2, . . . via a suitable controllable valve apparatus with primary mixture (A∞B). The mixture (C∞B)+A obtained by extraction, the tea concentrate C∞B with the extracted tea leaves A, is discharged and supplied via the drainage connection 15 and other drainage connections 14.1, 14.2, . . . .

Figure 3:
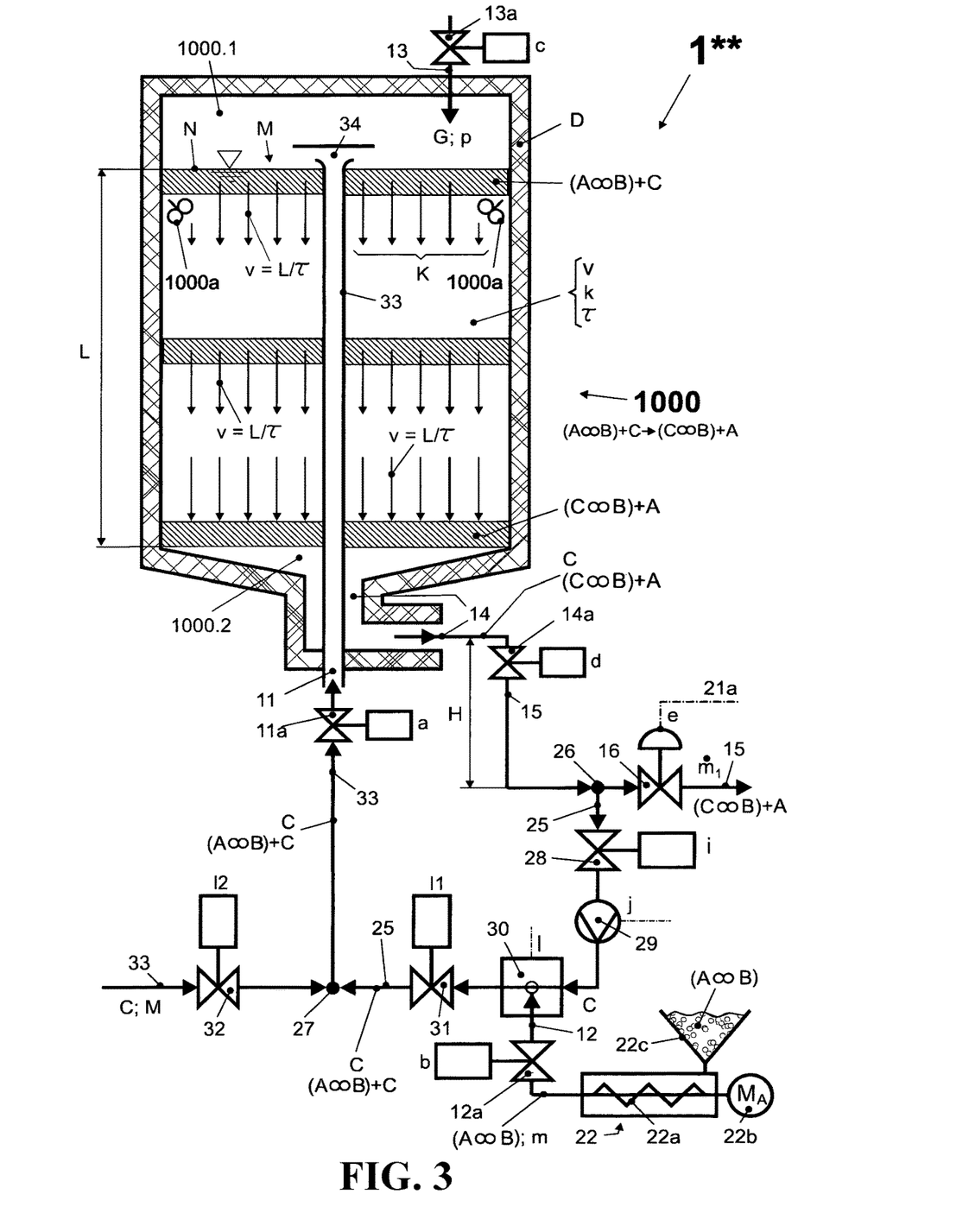
FIG. 3 shows a schematic representation of a third device with a third extraction container.

Third Device (FIG. 3)

A third device 1 according to the invention for controlling the production of an extract by means of solid-liquid extraction, in particular solid-liquid hot extraction, by means of a third extraction container 1000, from which a circulation line 25 branching off a drain line 15** runs, is shown in FIG. 3.

The third extraction container 1000 has a supply line 33 in which, viewed in the direction of flow, is provided upstream from a joining point 27 of a third shutoff valve 32, wherein this part of the supply line 33 serves to supply the secondary solvent C with the first mass M [hot water]. Downstream from the joining point 27, the supply line 33 enters via the supply connection 11 with the supply valve 11a for supplying the secondary solvent C [hot water] or a mixture (A∞B)+C of primary mixture (A∞B) and secondary solvent C [mixture of tea leaves and hot water] via a third foot area 1000.2 into the third extraction container 1000, and penetrates it up to a third headspace 1000.1, and discharges there via an outlet 34 above a free surface N (maximum height of the liquid level). A drainage connection 14 for discharging the secondary solvent C or a mixture (C∞B)+A consisting of an extract (C∞B) and a raffinate A [tea concentrate+extracted tea leaves], leaves the third foot area 1000.1 and transitions there into the drain line 15. The drainage connection 14 is preferably arranged centrally and at the bottom end of the third extraction container 1000, and the supply line 33 is preferably guided concentrically through the drainage connection 14.

The drain line 15 is at a vertical distance from the drainage connection 14 with the drain valve 14a by the supply height H in the direction of gravity. The drain line 15 joins the control valve 16 and continues from there into the additional third device 1. This part of the third device 1 is identical with the corresponding part of the first, or respectively second device 1, 1*.

Upstream from the control valve 16, the circulating line 25 branches at a branching point 26 from the drain line 15 and joins the supply line 33 at the joining point 27. The circulating line 25 is flowed through from the branching point 26 to the joining point 27. Provided inside the circulating line 25, relative to the branching point 26, are first a first shutoff valve 28, a pump 29 for conveying the secondary solvent C, then a dosing apparatus 30 for dosing the primary mixture (A∞B) into the secondary solvent C, and a second shutoff valve 31. The dosing apparatus 30 is connected via the first supply connection 12 to the first supply valve 12a with the product-friendly, rotating displacement pump 22.

An advantageous embodiment of the third extraction container 1000 provides that at least two third stirring apparatuses 1000a are provided in a liquid-impacted outer region of the third headspace 1000.1 at the edge that are preferably arranged evenly distributed over this outer region. Due to their particular installation position, the third stirring apparatuses 1000a are able to generate a flow movement directed toward the center of the third extraction container 1000 with a flow component oriented in the direction of gravity that helps the formation of a plug flow K.

The third extraction container 1000 possesses the insulation D for insulating the third extraction container 1000 against its environment. Moreover, at the top end of a third headspace 1000.1, the supply connection 13 with the supply valve 13a is provided for supplying the compressed gas G with the gas pressure p.

In automatic mode, the control apparatus 21 (not shown in FIG. 3) is additionally connected in terms of signaling to the first shutoff valve 28, the pump 29, the dosing apparatus 30, and the second and the third 31, 32 shutoff valves (e.g., signal connections i, j, l, 11, and 12).

Third Method (FIG. 3)

The third method is carried out over the course of steps (i) and (ii) in and with the third extraction container 1000, wherein the first mass M provided according to step (i), which is preferably supplied via the outlet 34 of the supply line 33 discharging above the free surface N, is forcibly discharged over the dwell time τ in the form of the plug flow K oriented in the direction of gravity through the drainage connection 14. A forcibly generated mass flow of the first mass M is continuously added to a mass flow of the second mass m via the dosing apparatus 30 such that a desired mass ratio of the second mass m to the first mass M with the concentration k=m/(M+m) is ensured in the obtained mixture. The continuously obtained mixture is supplied from above to the free surface N of a mixture located in the third extraction container 1000. The dosing of the second mass m into the first mass M ends when the mixture (A∞B)+C [mixture of tea leaves+hot water] first supplied to the third extraction container 1000 has flowed as a mixture (C∞B)+A [tea concentrate+extracted tea leaves] from top to bottom through the third extraction container 1000 in the form of the plug flow K after the expiration of the dwell time τ. During this throughput time that corresponds to the average dwell time, or respectively the brewing time τ, the exchange of substances by extraction occurs. Then the third method is continued according to the steps (iii) to (ix) and in advantageous embodiments according to steps (x) to (xiii).

In an ideal case, the plug flow K moves at a sinking speed v that results from a maximum filling height L and the average dwell time τ (v=L/τ) so that the average dwell time τ is adjusted by the filling level L and the sinking speed v determined by the delivery of the pump 29. The mixture consisting of tea leaves and hot water (A∞B)+C supplied to the outlet 34 accordingly sinks over the average dwell time τ from the maximum filling height L down into the outlet 14 of the third extraction container 1000, whereby a more or less continuous extraction method is realized.

The generation of the plug flow K is supported in particular in startup mode, as well as in continuous and shut-off mode by the described third stirring apparatuses 1000a.

Given the parallel connection of at least two extraction containers 10, or 100, or 1000 that are operated staggered in time in this respective configuration, continuous operation of the controllable vibration or shaking sieve 18, 19 is ensured. This continuous operation increases the production output in comparison to a respective pure batch operation in individual extraction containers 10, or 100, or 1000.

The following is a list of reference numbers used in the drawings and this description, with reference to the figures in which they first appear.

FIGS. 1 and 2
 1 First device
 1 Second device
 10 First extraction container
 10', 10" Additional first extraction containers
 100 Second extraction container
 10.1 First headspace
 10.2 First foot area
 10a First stirring apparatus
 100.1 Second headspace
 100.2 Second foot area
 100a Second stirring apparatus
 11 Supply connection
 11a Supply valve
 12 First supply connection
 12.1, 12.2, . . . Additional first supply connections
 12a First supply valve
 12.1a, 12.2a, . . . Additional first supply valve
 13 Supply connection
 13a Supply valve
 14 Drainage connection
 14.1, 14.2, . . . Additional drainage connection
 14a Drain valve
 14.1a, 14.2a, . . . Additional drain valve
 15 Drain line
 16 Control valve 17 First mass flow meter
18 Separating device
18a Sieve
18b Raffinate collecting container
19 Dehumidifying apparatus
19a Vibration or shaking drive
18+19 Vibration or shaking sieve
20 Second mass flow meter
21 Control apparatus
21a Signal transmission lines
22 Delivery apparatus
22a Screw conveyor
22b Drive motor
22c Storage tank
23 Centrifugal separator
24 Filter apparatus
D Insulation
G Gaseous propellant—compressed gas (air, nitrogen, inert gas)
H Supply height
Ib1 First inner region
Ib2 Second inner region
Ib3, . . . , Ib(n−1), Ibn Additional inner regions
$M_A$ Drive motor (general)
ME Mechanical energy
N Free surface (liquid level)
P Particles
a to h Signal connection
n Finite number of inner regions Ib
p Gas pressure
FIG. 3
1** Third device
1000 Third extraction container
1000.1 Third headspace
1000.2 Third foot area
1000a Third stirring apparatus
25 Circulation line
26 Branching point
27 Joining point
28 First shutoff valve
29 Pump
30 Dosing apparatus
31 Second shutoff valve
32 Third shutoff valve
33 Supply line
34 Outlet
K Plug flow
L Maximum filling height
i, j, l, l1, l2 Signal connection
v Sinking speed
FIG. 4

| | Superordinate terms | Special application: Production of tea concentrate |
|---|---|---|
| A | Primary solvent (before extraction) | Carrier material (before extraction) |
| A | Raffinate (= primary solvent after extraction) | Extracted tea leaves |
| $A^+$ | Raffinate with residual moisture | Extracted tea leaves with residual moisture |
| B | Transition component | Theine and other desirable and undesirable accompanying substances |
| C | Secondary solvent | Hot water or boiling water |
| (A∞B) | Primary mixture | Tea leaves (tea raw material) |
| (A∞B) + C | Mixture of primary mixture and secondary solvent | Mixture of tea leaves and hot water |
| (C∞B) | Extract | Tea concentrate (filtered in the end step) |
| (C∞B)** | Extract freed from raffinate and residual moisture $A^+$ | Tea concentrate freed from extracted tea leaves with residual moisture $A^+$ |
| (C∞B)* | Pre-clarified extract | Pre-clarified tea concentrate |
| (C∞B) + A | Mixture (extract + raffinate after extraction) | Tea concentrate + extracted tea leaves |
| M | first mass (C) | first mass (hot water) |
| M', M'', M''' | first partial mass (C) | first partial mass (hot water) |
| K | Concentration of the primary mixture (A∞B) relative to the solvent C and the primary mixture (A∞B) | Concentration of the tea leaves (A∞B) relative to the hot water C and the tea leaves (A∞B) |
| M | second mass (A∞B) | second mass (tea leaves) |
| m', m'', m''' | second partial mass (A∞B) | second partial mass (hot water) |
| $\dot{m}_1$ | first mass flow (extract (C∞B) + raffinate with residual moisture $A^+$) | first mass flow (tea concentrate + extracted tea leaves with residual moisture $A^+$) |
| $\dot{m}_2$ | second mass flow (of the extract (C∞B)* freed from raffinate with residual moisture $A^+$) | second mass flow (of the tea concentrate (C∞B)* freed from extracted tea leaves with residual moisture $A^+$) |
| $\Delta m(A∞B)$ | second differential mass of the primary mixture (A∞B) over the time span $\Delta t$ | second differential mass of the tea leaves (A∞B) over the time span $\Delta t$ |
| $\Delta m(A^+)$ | first differential mass of the raffinate with residual moisture $A^+$ over the time span $\Delta t$ | first differential mass of the extracted tea leaves with residual moisture $A^+$ over the time span $\Delta t$ |
| $\Delta m(A^+)_{tol}$ | tolerable first differential mass of the raffinate with residual moisture $A^+$ over the time span $\Delta t$ | tolerable first differential mass of the extracted tea leaves with residual moisture $A^+$ over the time span $\Delta t$ |

-continued

| | Superordinate terms | Special application: Production of tea concentrate |
|---|---|---|
| $\Delta t$ | Time span (finite) | |
| Dt | Time span (infinitesimal) | |
| $\Delta$ | tolerable portion of extract (C∞B) in the raffinate with residual moisture $A^+$ | tolerable portion of tea concentrate (C∞B) in the extracted tea leaves with residual moisture $A^+$ |
| T | Dwell time | Brewing time |

The invention claimed is:

1. A method to control production of an extract by means of solid-liquid extraction by means of an extraction container in which a secondary solvent with a first mass and a primary mixture consisting of a solid primary solvent and a transition component with a second mass are brought into contact with each other for a predetermined dwell time to obtain the extract, and in which the obtained extract and a complementary portion of raffinate are separated from each other after the dwell time, the method comprising:
(i) providing the first mass in the extraction container using at least one supply connection, wherein:
the extraction container has an inner region that, in a top region, possesses at least one supply connection for supplying the primary mixture and for supplying the transition component as a secondary solvent, and, in a bottom region, a drainage connection for drainage of a mixture consisting of an extract and a raffinate,
the drainage connection discharges into a drain line,
the drain line has, viewed in a direction of flow and at a vertical distance from the drainage connection by a supply height relative to the direction of gravity, a control valve, a first mass flow meter for determining a first mass flow for the mixture, a separating device for separating the mixture into the extract and a raffinate with residual moisture, a dehumidification apparatus for dehumidifying the raffinate with residual moisture, and a second mass flow meter for determining a second mass flow for an extract free from raffinate with residual moisture, and
the separating device and the dehumidification apparatus each comprise a vibration or shaking sieve;
(ii) supplying the second mass to the first mass and distributing and mixing the second mass into and with the first mass;
(iii) discharging, into the drain line, a mixture consisting of the extract and the raffinate from the extraction container using the drainage connection;
(iv) separating the mixture discharged according to step (iii) into the raffinate with residual moisture and an extract released from the raffinate with residual moisture;
(v) further treating the raffinate with residual moisture at least such that the residual moisture consisting of the extract is at least partly removed from the raffinate with residual moisture by dehumidification and is supplied to the separated extract;
(vi) dehumidifying the raffinate with residual moisture to a tolerable portion of extract in the raffinate with residual moisture by supplying mechanical energy to the raffinate with residual moisture;
(vii) determining, using the first mass flow meter, the first mass flow of the mixture discharged according to step (iii), and determining, using the second mass flow meter, the second mass flow of the extract freed from raffinate with residual moisture obtained according to steps (iv) and (v), in each case over a span of time;
(viii) determining a degree of dehumidification by comparing the first mass flow with the second mass flow, wherein a mass difference resulting therefrom in the time span before and after humidification is compared with a mass difference arising with complete dehumidification that corresponds to the mass of the primary solvent before extraction within the time span; and
(ix) controlling, using a control apparatus, the degree of dehumidification carried out according to steps (v) and (vi) by feedback control intervention to the first mass flow and a supply of the mechanical energy based on the tolerable portion, wherein the control apparatus, in terms of signaling, is connected to the control valve, the first mass flow meter, the second mass flow meter, and the vibration or shaking sieve.

2. The method according to claim 1, wherein:
the second mass is not added completely but rather in portions and continuously to the secondary solvent.

3. The method according to claim 1, comprising:
(x) controlling the first mass flow depending on the raffinate with residual moisture such that, when the tolerable portion is exceeded, at least one of:
a) the first mass flow is reduced while the supply of mechanical energy remains unchanged,
b) the supply of mechanical energy is increased while the first mass flow remains unchanged, or
c) the first mass flow is reduced, and the supply of mechanical energy is simultaneously increased until the tolerable portion rises.

4. The method according to claim 1, wherein:
the tolerable portion established in step (vi) correlates with other control parameters that are determined with method steps as follows:
(xi) determining a first differential mass of the raffinate with residual moisture from the first and second mass flows determined according to step (vii) according to a balance equation as follows:

$$\Delta m(A^+) = (\dot{m}_1 - \dot{m}_2)\Delta t;$$

(xii) determining a second differential mass of the primary mixture from the first mass flow determined according to step (vi) according to a relationship as follows:

$$\Delta m(A\infty B) = \dot{m}_1 \Delta t k,$$

wherein a concentration results with $$k = \frac{m}{M+m} = \frac{m(A\infty B)}{M(C) + m(A\infty B)} = \frac{m(A\infty B)}{(M+m)((C\infty B) + A)};$$

and (xiii) determining a tolerable first differential mass of the raffinate with residual moisture according to the first differential mass ($\Delta m(A^+)$) determined according to step (xi), and the second differential mass m($A\infty B$)) determined according to step (xii) according to a definitional determination for the tolerable portion as follows:

$$\delta = \frac{\Delta m(A^+)_{tol} - \Delta m(A\infty B)}{\Delta m(A^+) - \Delta m(A\infty B)}.$$

wherein:
$\delta$ is the tolerable portion,
$\Delta m(A^+)$ is the first differential mass of the raffinate with residual moisture $A^+$,
$\dot{m}_1$ is the first mass flow,
$\dot{m}_2$ is the second mass flow,
$\Delta t$ is the span of time,
$\Delta m(A\infty B)$ is the second differential mass of the primary mixture ($A\infty B$) consisting of the solid primary solvent (A) and the transition component (B),
k is the concentration,
M is the first mass of the secondary solvent (C),
m is the second mass of the primary mixture $A\infty B$,
$C\infty B$ is the extract, and
$\Delta m(A^+)_{tol}$ is a tolerable first differential mass of the raffinate with residual moisture $A^+$.

5. The method according claim 1, wherein:
the dehumidification of the raffinate with residual moisture performed with step (v) is performed concurrently with or after the separation of the mixture performed with step (iv).

6. The method according to claim 1, wherein:
all the obtained extract freed from raffinate with residual moisture is subject to filtration to segregate undesirable fine and very fine particles.

7. The method according to claim 1, wherein:
all the obtained extract freed from raffinate with residual moisture is subject to separation in a centrifugal field for pre-clarification and thereby becomes a pre-clarified extract.

8. The method according to claim 1, wherein:
the mixture discharged according to step (iii) is discharged solely under an effect of gravity.

9. The method according to claim 8, wherein:
the discharging of the mixture is additionally supported by applying a gas pressure from a gaseous propellant to a free surface of the mixture.

10. The method according to claim 1, wherein:
the part of the method defined by steps (i) and (ii) is carried out in the extraction container that is a discontinuously working homogeneous reaction container, wherein to ensure a desired mass ratio of the second mass to the first mass, the second mass is supplied completely to the first mass.

11. The method according to claim 1, wherein:
the part of the method defined by steps (i) and (ii) is carried out in the extraction container that is a discontinuously working homogeneous reaction container, wherein the second mass is divided into a finite number of second partial masses, and in so doing into at least two second partial masses, and the second partial masses are each supplied separate from each other to corresponding first partial masses of the first mass to ensure a desired mass ratio of the second mass to the first mass.

12. The method according to claim 1, wherein:
the part of the method defined by steps (i) and (ii) is performed in the extraction container, and wherein the first mass added according to step (i) is discharged during the dwell time as a plug flow oriented in the direction of gravity,
a forcibly generated mass flow of the first mass is continuously added to a mass flow of the second mass such that a desired mass ratio of the second mass to the first mass is ensured in the discharged mixture,
the discharged mixture as continuously discharged is supplied from above to a free surface of a mixture located in the extraction container,
ending supplying the second mass to the first mass when the mixture first supplied to the extraction container has flowed as a mixture from top to bottom through the extraction container as the plug flow after expiration of the dwell time, and
the method is continued according to steps (iii) to (ix).

13. A device for controlling production of an extract by means of solid-liquid extraction using an extraction container, wherein:
the extraction container has an inner region that, in a top region, possesses at least one supply connection for supplying a primary mixture and for supplying a secondary solvent, and, in a bottom region, a drainage connection for drainage of a mixture consisting of an extract and a raffinate,
the drainage connection discharges into a drain line,
the drain line has, viewed in a direction of flow and at a vertical distance from the drainage connection by a supply height relative to the direction of gravity, a control valve, a first mass flow meter for determining a first mass flow for the mixture, a separating device for separating the mixture into the extract and a raffinate with residual moisture, a dehumidification apparatus for dehumidifying the raffinate with residual moisture to a tolerable portion of extract in the raffinate with residual moisture by supplying mechanical energy to the raffinate with residual moisture, and a second mass flow meter for determining a second mass flow for an extract free from raffinate with residual moisture,
the separating device and the dehumidification apparatus each comprise a vibration or shaking sieve, and
a control apparatus is provided that, in terms of signaling, is connected to the control valve, the first mass flow meter, the second mass flow meter, and the vibration or shaking sieve, and that controls a degree of dehumidification by a feedback control intervention to the first mass flow and a supply of the mechanical energy based on the tolerable portion.

14. The device according to claim 13, wherein:
viewed in the direction of flow, a filter apparatus is arranged after the second mass flow meter in the drain line.

15. The device according to claim 14, wherein:
viewed in the direction of flow, the filter apparatus is upstream from a centrifugal separator.

16. The device according to claim 13, wherein:
the extraction container is a discontinuously working homogeneous reaction container,
the inner region comprises a single inner region,
the supply connection in the top region is a single supply connection, and the drainage connection in the bottom region is a single drainage connection.

17. The device according to claim 13, wherein:
the extraction container is as a discontinuously working homogeneous reaction container,
the inner region comprises a number of inner regions including a first inner region, and each additional inner region is arranged above a preceding inner region and directly adjacent thereto,
the at least one supply connection comprises multiple first supply connections, wherein each inner region is assigned a respective first supply connection of the multiple first supply connections for supplying the primary mixture and comprises a second supply connection for supplying the secondary solvent in a top region of the extraction container, and
the drainage connection comprises multiple drainage connections, wherein each inner region is assigned a respective drainage connection below and at a distance from the respective first supply connection, such that the mixture obtained in each inner region is discharged as unadulterated as possible from the primary mixture that flows to the adjacent inner region below via the assigned first supply connection.

18. The device according to claim 13, comprising:
rotating delivery apparatus connected to a storage tank of the primary mixture for treatment of the primary mixture before the primary mixture is supplied to a supply connection of the at least one supply connection.

19. The device according to claim 13, wherein:
the extraction container has a supply connection for supplying a compressed gas in the region of a top end of the extraction container.

20. The device according to claim 13, wherein the control apparatus is configured to control the first mass flow depending on the raffinate with residual moisture such that, when the tolerable portion is exceeded, at least one of:
the first mass flow is reduced while the supply of mechanical energy remains unchanged,
the supply of mechanical energy is increased while the first mass flow remains unchanged, or
the first mass flow is reduced, and the supply of mechanical energy is simultaneously increased until the tolerable portion rises.

21. A device for producing an extract by means of solid-liquid extraction by means of an extraction container from which a circulation line branching off a drain line runs, wherein the extraction container:
has a supply line for supplying a secondary solvent or a mixture consisting of a primary mixture and the secondary solvent, and the supply line enters via a foot area into the extraction container, penetrates the extraction container up to a headspace, and discharges at the headspace via an outlet, and
has a drainage connection for discharging the secondary solvent or a mixture consisting of an extract and a raffinate, and the drainage connection leaves the foot area and transitions there into the drain line,
the drain line has, viewed in a direction of flow and at a vertical distance from the drainage connection by a supply height in the direction of gravity;
a control valve, a first mass flow meter for determining a first mass flow for the mixture, a separating device for separating the mixture into the extract and a raffinate with residual moisture, a dehumidification apparatus for dehumidifying the raffinate with residual moisture, and a second mass flow meter for determining a second mass flow for an extract free from raffinate with residual moisture, wherein the separating device and the dehumidification apparatus each comprise vibration or shaking sieve,
from the drain line, upstream from the control valve:
the circulating line branches at a branching point and joins the supply line at a joining point, and is flowed through from the branching point to the joining point, and
inside the circulating line, relative to the branching point, first a pump for conveying the secondary solvent and then a dosing apparatus for dosing primary mixture into the secondary solvent are provided, and
a control apparatus provided that, in terms of signaling, is connected to the control valve, the first mass flow meter, the second mass flow meter, and the vibration or shaking sieve, and that controls a degree of dehumidification by a feedback control intervention in the first mass flow and a supply of mechanical energy.

22. The device according to claim 21, wherein:
at least two stirring apparatuses are provided in a liquid-impacted outer region of the headspace arranged over an outer region and, due to their installation position, are able to generate a flow movement directed toward a center of the extraction container with a flow component oriented in the direction of gravity.

23. The device according to claim 21, wherein:
the drainage connection is arranged centrally and at a bottom end of the extraction container, and the supply line is guided concentrically through the drainage connection.

24. The device according to claim 21, wherein:
the dosing apparatus is connected to a rotating displacement pump.

* * * * *